Nov. 27, 1962 M. C. VANCE 3,065,646
CONVEYOR BELT TAKE-UP MECHANISM
Filed March 15, 1961 2 Sheets-Sheet 1

Merton C. Vance
INVENTOR.

Nov. 27, 1962  M. C. VANCE  3,065,646
CONVEYOR BELT TAKE-UP MECHANISM
Filed March 15, 1961  2 Sheets-Sheet 2

Merton C. Vance
INVENTOR.

United States Patent Office 3,065,646
Patented Nov. 27, 1962

3,065,646
CONVEYOR BELT TAKE-UP MECHANISM
Merton C. Vance, Route 2, Box 106A, Grandview, Wash.
Filed Mar. 15, 1961, Ser. No. 108,221
11 Claims. (Cl. 74—241)

This invention relates to a new and useful conveyor belt take-up mechanism which is mounted at one end of a conveyor frame and is operative to automatically maintain the conveyor belt under the proper tension.

It is therefore a primary object of this invention to provide an end mount conveyor belt take-up mechanism of a novel construction and arrangement capable of automatically maintaining the conveyor belt under a proper and uniform tension to an extent or degree heretofore not possible with comparable take-up mechanisms.

Another object of this invention is to provide an automatic conveyor belt take-up mechanism which is more easily installed and effectively operative to accommodate irregularities in the conveyor belt construction and loads carried thereon so as to maintain the belt tensioned at all times under the proper and uniform tension throughout.

It will be appreciated, that material handling machinery which include conveyor belts of considerable length, are subjected to variable loading and often times to non-uniformly distributed loading which requires constant adjustment of the tension applied to the conveyor belt both as to the tensioning force and the distribution of the tensioning force in a lateral direction with respect to the conveyor belt.

By the present invention, a take-up mechanism is provided which meets the aforementioned problem. The conveyor belt take-up mechanism of the present invention, therefore, involves a frame assembly mounted at one end of the conveyor frame, which frame assembly is pivotally displaceable with respect to the conveyor frame for the purpose of varying the distribution of the tensioning force applied to the conveyor belt by the take-up pulley rotatably mounted on the take-up frame assembly. The take-up frame assembly includes therefore, a pair of downwardly facing rack members which mesh with pinion gears fixed adjacent to opposite axial ends of the take-up pulley about which the conveyor belt is entrained. The pinion gears are rotatably mounted on separate carriage assemblies which are guidingly and slidably mounted on the rack members by support rollers provided for the purpose of suspending the carriage assemblies from the take-up frame assembly. Also connected to each axial end of the take-up pulley shaft are a pair of tensioning pulley wheels to which tensioning weights are connected for the purpose of independently applying a constant rotative force to each end of the take-up pulley shaft which tends to slidably displace the carriage assembly rotatively supporting each end of the take-up pulley on the take-up frame assembly by virtue of the meshing engagement between the rack members of the take-up frame assembly and the pinion gears connected to the take-up pulley shaft. Accordingly, the take-up pulley will be displaced on the take-up frame assembly in a tensioning plane in order to tension the conveyor belt with speed and constant tensioning forces. However, it will be appreciated that by virtue of a non-uniformly distributed load on the conveyor belt and by virtue of the non-uniform deformation of the belt material, displacement of the belt by the tensioning applied to the opposite ends of the take-up pulley may need correction in order to support a smoothly operative conveyor belt and prolong the life thereof. Accordingly, a pair of guide rollers adjustably mounted on the take-up frame assembly and projecting therefrom, engage the lateral sides of the lower run of the conveyor belt so that upon lateral displacement of the conveyor belt with respect to the conveyor frame, one or the other of the guide rollers will be laterally displaced effecting pivotal displacement of the take-up frame assembly as a result thereof in such a direction as to correctively redistribute the tensioning applied to the conveyor belt by the take-up pulley rotatably mounted on the take-up frame assembly. From the foregoing, it will be apparent that the take-up mechanism of the present invention will not only provide the proper tensioning for a conveyor belt but will also always maintain it in a smoothly operating condition and prolong the life thereof by assuring that the stresses applied thereto are evenly distributed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
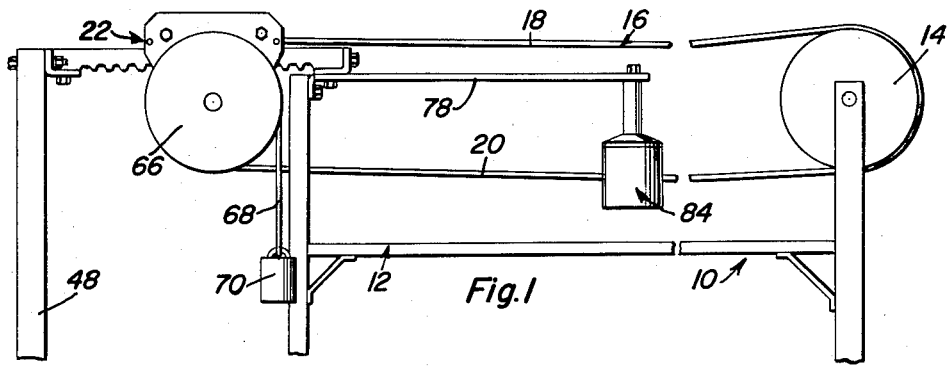
FIGURE 1 is a side elevational view of a conveyor belt assembly with the take-up mechanism of the present invention installed thereon.

Referring now to the drawings in detail, FIGURE 1 illustrates a conveyor assembly generally referred to by reference numeral 10. The conveyor assembly includes a conveyor frame generally referred to by reference numeral 12 which supports a fixed end pulley 14 about which a conveyor belt 16 is entrained having an upper run 18 and a lower run 20. Supported at the end of the conveyor frame 12, opposite the fixed end pulley 14 is the conveyor belt take-up mechanism generally referred to by reference numeral 22 to which the present invention relates. The take-up mechanism 22 accordingly adjustably mounts the take-up pulley 24 as more clearly seen in FIGURE 2.

Figure 2:
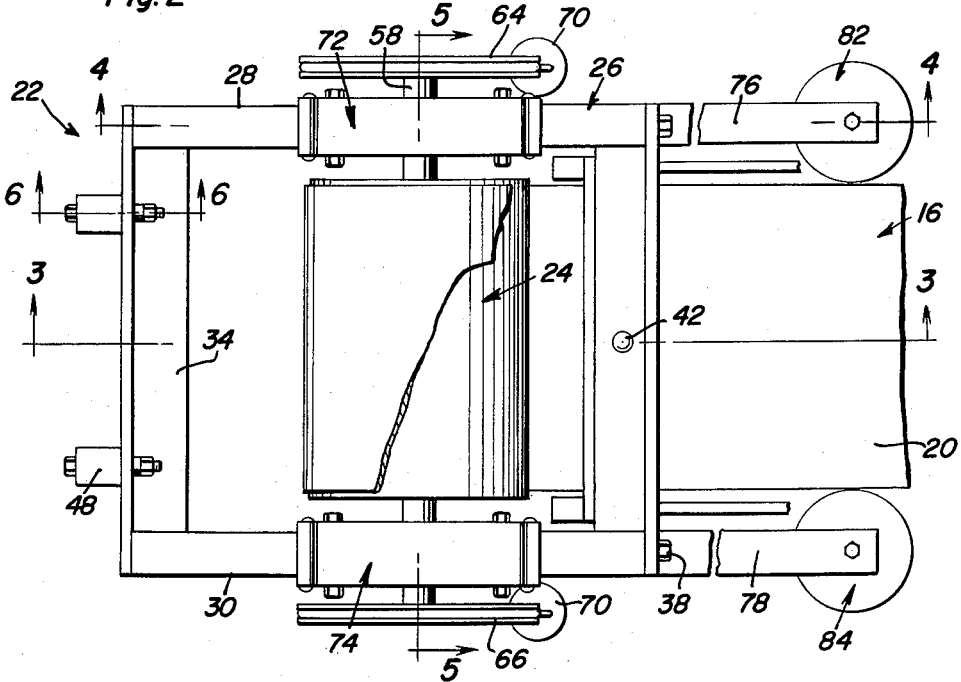
FIGURE 2 is a partial top plan view of the conveyor assembly with the belt take-up mechanism applied thereto, the upper run of the conveyor belt being cut-away.
Figures 6, 7:
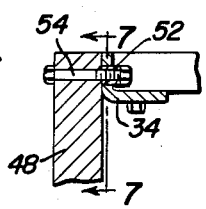
FIGURE 6 is a partial sectional view taken through a plane indicated by section line 6—6 in FIGURE 2.
FIGURE 7 is a sectional view taken through a plane indicated by section line 7—7 in FIGURE 6.
Figure 3:
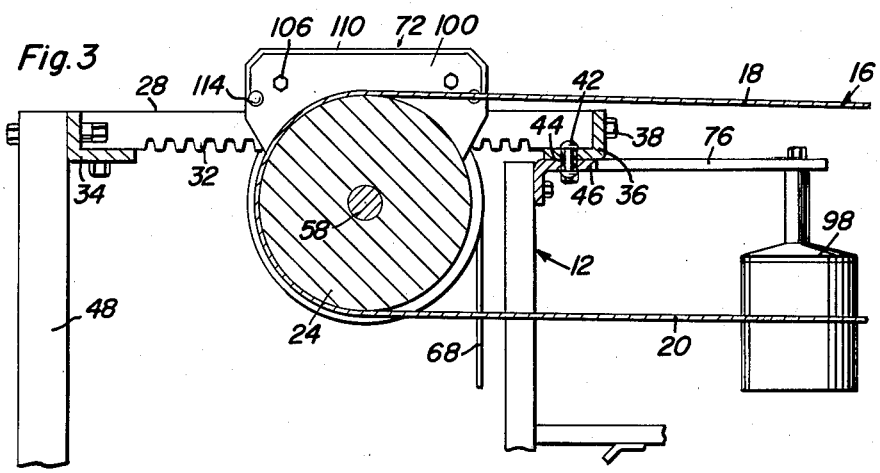
FIGURE 3 is a sectional view taken substantially through a plane indicated by section line 3—3 in FIGURE 2.
Figure 4:
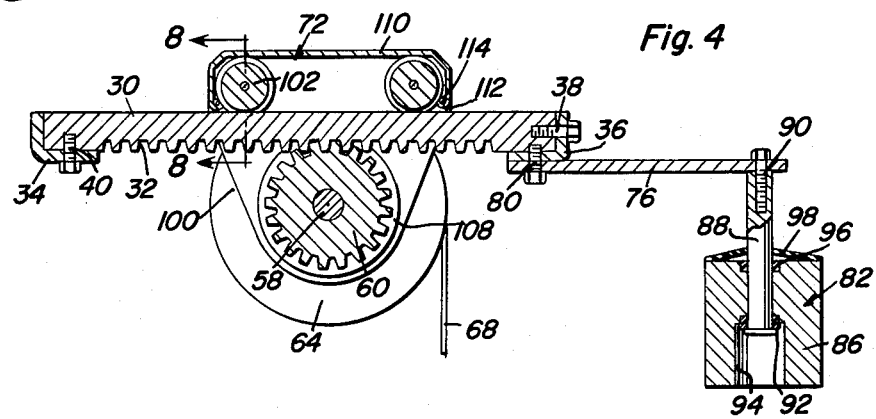
FIGURE 4 is a sectional view taken substantially through a plane indicated by section line 4—4 in FIGURE 2.
Figure 5:
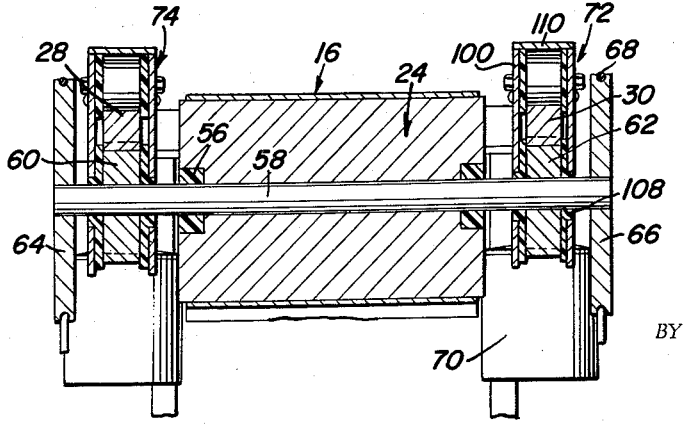
FIGURE 5 is a sectional view taken substantially through a plane indicated by section line 5—5 in FIGURE 2.

Referring therefore to FIGURE 2 it will be observed that the take-up mechanism 22 includes a take-up frame assembly generally referred to by reference numeral 26. The take-up frame assembly 26 includes a pair of rack members 28 and 30 disposed on opposite sides of the take-up pulley 24 and on opposite lateral sides of the conveyor belt 16. Referring therefore to FIGURES 3, 4 and 5 as well as to FIGURE 2, it will be observed that the rack members 28 and 30 include downwardly facing rack teeth 32 and are rigidly interconnected by cross frame members 34 and 36. Accordingly, screw fastener elements 38 rigidly connect the cross frame member 36 to the rack members 28 and 30 while screw fastener elements 40 rigidly connect the cross frame member 34 to the rack members 28 and 30. The cross frame members are preferably in the form of unequal leg angle members as indicated in the drawing figures. The cross frame member 36 as more clearly seen in FIGURE 3, is pivotally connected to the conveyor frame 12 by means of a center pivot member 42 extending through a nylon sleeve bearing 44 for pivotally connecting the frame assembly 26 to a cross frame member 46 suitably fastened to the conveyor frame 12. Support for the other end of the take-up frame assembly 26 is provided by a pair of support members 48 which not only maintain the projecting end of the take-up frame assembly 26 in spaced relation above the floor but also accommodates lateral shifting thereof when the take-up frame 26 is pivotally displaced with respect to the conveyor frame 12 about the center pivot 42. Referring therefore to FIGURES 6 and 7 in particular it will be observed that the cross frame member 34 is provided on the vertical shorter leg portion thereof with a pair of guide slots 50 through which a nylon sleeve bearing 52 extends which nylon sleeve bearing is mounted on a support bolt member 54 disposed in the support members 48. Accordingly, the cross frame member 34 and the take-up frame assembly 26 at the end thereof opposite the center pivot member 42 may shift in a lateral direction in response to pivotal displacement of the take-up frame assembly 26 as will hereafter be described.

The take-up pulley 24 is rotatably mounted by nylon bearings 56 on a take-up pulley shaft 58 as more clearly seen in FIGURE 5. Rotatably connected to the pulley shaft 58 on opposite sides of the take-up pulley 24, are a pair of pinion gears 60 and 62 as well as a pair of tension pulley wheels 64 and 66. The pinion gears 60 and 62 respectively mesh with the rack teeth 32 on the rack members 28 and 30. The tension pulley wheels on the other hand, are connected by a cable 68 to tensioning weights 70. It will therefore, be apparent, that the tensioning weights 70 will apply a rotative torque to the take-up pulley shaft 58 and to the pinion gears 60 and 62 connected thereto so as to cause rotation of the gears along the rack members whereupon the take-up pulley shaft 58 will be displaced in a belt tensioning direction. The take-up pulley 24 will accordingly be constantly urged at each axial end thereof to a position for applying a predetermined tension to the conveyor belt 16, depending upon the value of the weights 70. It will however be apparent that suitable facilities must be provided for rotatably mounting the take-up pulley shaft 58 which mounting will appreciably effect the manner in which the conveyor belt is tensioned under the influence of the weights 70.

A pair of carriage assemblies 72 and 74 are therefore provided for rotatably mounting the opposite ends of the pulley take-up shaft 58 for support thereof by the take-up frame assembly 26. Each of the carriage assemblies 72 and 74 are of identical construction and will be independently displaceable on the take-up frame assembly to a certain extent by the respective tensioning pulley wheel and pinion gears. It will be apparent therefore, that any difference in the loading of the conveyor belt along a lateral direction thereof causing a laterally varying stress to be applied therein, will cause a difference in displacement of the carriage assemblies limited only by their interconnection by the common take-up pulley shaft 58. It will therefore be further apparent, that such a loading condition on the belt will require unequal displacement of the carriage assemblies 72 and 74 in order to maintain a uniform tension thereon. However, as a result of such difference in the displacement of the carriage assemblies 72 and 74, the belt 16 entrained thereabout will also be laterally displaced in view of the fact that any difference in the slidable displacement of the carriage assemblies 72 and 74 on the take-up frame assembly will cause pivotal displacement of the take-up pulley 24 from a position perpendicular to the longitudinal axis of the conveyor belt. In order to correct such pivotal displacement of the take-up pulley 24 and the belt 16 entrained thereabout, so as to maintain the conveyor belt operating smoothly, a pair of guide bars 76 and 78 are adjustably connected to the take-up frame assembly 26 by the fastener elements 80 as more clearly seen in FIGURE 4. The guide bars 76 and 78 project from the take-up frame assembly 26 between the upper and lower runs of the conveyor belt 16 and rotatably mount at the projecting ends thereof a pair of guide rollers 82 and 84. Each of the guide rollers 82 and 84 include a roller body 86 which engages the lateral sides of the lower run 20 of the conveyor belt 16. The roller bodies 86 are rotatably mounted by a rod member 88 fastened to the remote end of the guide bars by a fastener element 90. The lower end of the rod members 88 are enlarged and carry thereon an axial collar 92 for holding the roller bodies 86 in assembled relation on the rod member 88. A recess 94 is accordingly provided in the roller body for accommodating the supporting end of the rod member 88. A pair of nylon bearings 96 are therefore also disposed between the rod member and the roller body 86. Also, a dirt shield member 98 is positioned on the rod member 88 in protective relation above the roller members in order to protect the roller guiding surfaces of the guide rollers from debris that may fall off the upper run of the conveyor belt. It will therefore be apparent that the aforementioned lateral displacement of the take-up pulley 24 and the conveyor belt will cause one or the other of the guide rollers 82 or 84 to displace the take-up frame assembly about the center pivot 42 in such a direction as to corect the aforementioned pivotal displacement of the take-up pulley 24 with respect to the take-up frame assembly 26.

Figure 8:
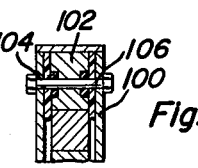
FIGURE 8 is a sectional view taken through a plane indicated by section line 8—8 in FIGURE 4.

Referring now to FIGURES 3, 4 and 5, the construction of each of the carriage assemblies 72 and 74 which is essential to the proper functioning of the take-up mechanism, will become apparent. Each of the carriage assemblies include therefore a pair of side plate members 100. Rotatably mounted between the side plate members are a pair of support rollers 102 which guidingly engage the upper surfaces of the rack members. The carriage assemblies are accordingly suspended from and are slidably mounted with respect to the take-up frame assembly 26. Flanged nylon bearing members 104 are accordingly provided on the supporting bolt member 106 as more clearly seen in FIGURE 8 for the purpose of rotatably mounting the support rollers 102 and preventing metal-to-metal contact between the support rollers 102 and the side plate members 100 of the carriage assemblies. The lower portion of the side plate members 100 also rotatably mount the take-up pulley shaft 58 and the pinion gear connected thereto. Accordingly, flanged bearing members 108 are similarly disposed within the carriage assembly for rotatably journalling the shaft 58 therein and preventing metal to metal contact between the pinion gears and the side plate members 100 as well as to prevent metal-to-metal contact between the rack members and the side plate members through which they extend. It will also be observed that the support rollers 102 are protected by a trash guard member 110 which is disposed on top of the side plate members 100 and extend downwardly along the sides thereof above the rack members. The trash guard members 110 are also provided with inwardly projecting portions 112 by means of which the trash guard members are anchored to the side plate members 100 by the anchoring bolts 114.

From the foregoing description, operation and utility of the conveyor belt take-up mechanism will be apparent. It will also be appreciated that the present take-up mechanism operates in a novel manner to maintain constant and uniform tension on the conveyor belt despite the uneven load distribution thereon and also is self correcting as to lateral displacement of the conveyor belt resulting from the tendency of the take-up mechanism to maintain uniform tensioning on the belt despite any non-uniform loading thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a conveyor belt entrained about a fixed end pulley and a take-up pulley, rotatably mounted at opposite ends of a conveyor frame, a belt take-up mechanism rotatably mounting the take-up pulley at one end of the conveyor frame, said take-up mechanism comprising, take-up frame means pivotally supported by the conveyor frame about a vertical axis for limited lateral displacement with respect thereto, carriage means movably mounted on the take-up frame means for rotatably mounting the take-up pulley in an adjusted position with respect to the conveyor frame, constant tensioning means operatively connected to the carriage means for movably positioning the carriage means and take-up pulley on the take-up frame means for uniform tensioning of the conveyor belt, and aligning means operatively connected to the take-up frame means and engageable with the conveyor belt for directly displacing the take-up frame means with respect to the conveyor frame in response to unequal displacement of the conveyor belt by the take-up pulley.

2. The combination of claim 1, wherein said take-up frame means is pivotally connected at one end to the conveyor frame on one side of the carriage means between upper and lower runs of the conveyor belt and support means slidably connected to the take-up frame means at an end opposite to said one end for limiting lateral displacement thereof.

3. The combination of claim 2, wherein said aligning means includes guide means adjustably mounted on the take-up frame means and engageable with opposite lateral sides of the lower run of the conveyor belt to restore alignment thereof in response to lateral displacement of the guide means and the take-up frame means by unequal displacement of the conveyor belt by the take-up pulley.

4. The combination of claim 3 wherein said carriage means comprises, a pair of independently movable carriage assemblies slidably mounted on the take-up frame means on opposite axial sides of the take-up pulley for rotatably mounting the take-up pulley therebetween.

5. The combination of claim 4, wherein said constant tensioning means comprises gear means operatively connected to opposite ends of the take-up pulley and automatic means operatively connected to the gear means and the take-up frame means for applying constant tensioning force to the opposite ends of the take-up pulley.

6. The combination of claim 1, wherein said aligning means includes guide means adjustably mounted on the take-up frame means and engageable with opposite lateral sides of the lower run of the conveyor belt to restore alignment thereof in response to lateral displacement of the guide means and the take-up frame means by unequal displacement of the conveyor belt by the take-up pulley.

7. The combination of claim 1, wherein said carriage means comprises a pair of independently movable carriage assemblies slidably mounted on the take-up frame means on opposite sides of the take-up pulley for rotatably mounting the take-up pulley therebetween.

8. The combination of claim 1, wherein said constant tensioning means comprises gear means operatively connected to opposite axial ends of the take-up pulley and automatic means operatively connected to the rear means and the take-up frame means for applying constant tensioning force to the opposite ends of the take-up pulley.

9. In combination with a conveyor belt entrained about a fixed, end pulley and a take-up pulley, rotatably mounted at opposite ends of a conveyor frame about horizontal axes, a belt take-up mechanism rotatably mounting the take-up pulley at one end of the conveyor frame, said take-up mechanism comprising an end support, a take-up frame assembly including a pair of downwardly facing rack members interconnected at opposite ends by a pair of cross frame members, a center pivot pivotally connecting one cross frame member to the conveyor frame about a fixed vertical axis and slide bearings slidably mounting the other cross frame member in said end support for accommodating limited pivotal displacement of the take-up frame assembly about said vertical axis; a pair of carriage assemblies for rotatably mounting the take-up pulley therebetween, each carriage assembly including support rollers guidingly engageable with a rack member, a trash guard enclosing the support rollers above the rack members, and pinion gears connected to the take-up pulley and meshing with the rack member; tension wheels connected to the take-up pulley on opposite sides of the carriage assemblies, tensioning weights connected to each tension wheel; a pair of guide bars adjustably connected to the take-up frame assembly and projecting therefrom, guide rollers rotatably mounted by the guide bars and engageable with opposite lateral sides of a lower run of the conveyor belt and a dirt shield mounted above each guide roller.

10. In combination with a conveyor belt entrained about a fixed end pulley, and a take-up pulley rotatably mounted on opposite ends of a conveyor frame about horizontal axes, a belt take-up mechanism rotatably mounting the take-up pulley at one end of the conveyor frame, said take-up mechanism comprising, an end support, a take-up frame assembly including a pair of downwardly facing rack members interconnected at opposite ends by a pair of cross frame members, a center pivot pivotally connecting one cross frame member to the conveyor frame about a fixed vertical axis and slide bearings slidably mounting the other cross frame member in said end support for accommodating limited pivotal displacement of the take-up frame assembly about said vertical axis; a pair of carriage assemblies for rotatably mounting the take-up pulley therebetween, each carriage assembly including support rollers guidingly engageable with a rack member, and pinion gears connected to the take-up pulley and meshing with the rack member, tension wheels connected to the take-up pulley on opposite sides of the carriage assemblies, tensioning weights connected to each tension wheel; a pair of guide bars adjustably connected to the take-up frame assembly and projecting therefrom, guide rollers rotatably mounted by the guide bars and engageable with opposite lateral sides of a lower run of the conveyor belt for pivotal displacement of the take-up frame assembly in response to lateral displacement of the conveyor belt.

11. A belt tensioning take-up mechanism for an adjustably positioned take-up pulley having a belt entrained thereabout comprising, frame means displaceably mounting said take-up pulley for corrective displacement in a tnsioning plane, constant tensioning means operatively connected to said take-up pulley for applying laterally spaced, constant tensioning forces to opposite ends of said pulley in said tensioning plane, means operatively mounting said frame means for limited pivotal displacement about a fixed axis intersecting said tensioning plane and means responsive to lateral shift of said belt for directly displacing said frame means about said fixed axis for correctively distributing said constant tensioning forces to the belt.

References Cited in the file of this patent

UNITED STATES PATENTS

| 918,247 | Wysong | Apr. 13, 1909 |
| 1,023,253 | Keith | Apr. 16, 1912 |
| 2,304,843 | Nordquist | Dec. 15, 1942 |
| 2,762,662 | Sloyan | Sept. 11, 1956 |